United States Patent
Chen et al.

(10) Patent No.: US 10,193,665 B2
(45) Date of Patent: Jan. 29, 2019

(54) REFERENCE SIGNAL FOR 3D MIMO IN WIRELESS COMMUNICATION SYSTEMS

(71) Applicant: Texas Instruments Incorporated, Dallas, TX (US)

(72) Inventors: Runhua Chen, Plano, TX (US); Ralf Matthias Bendlin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 659 days.

(21) Appl. No.: 14/222,553

(22) Filed: Mar. 21, 2014

(65) Prior Publication Data

US 2014/0286182 A1 Sep. 25, 2014

Related U.S. Application Data

(60) Provisional application No. 61/804,096, filed on Mar. 21, 2013.

(51) Int. Cl.
*H04L 5/00* (2006.01)
*H04L 1/00* (2006.01)

(52) U.S. Cl.
CPC .......... *H04L 5/0023* (2013.01); *H04L 1/0026* (2013.01); *H04L 5/0048* (2013.01); *H04L 5/0085* (2013.01); *H04L 5/0057* (2013.01)

(58) Field of Classification Search
CPC .... H04W 24/10; H04L 5/0023; H04L 5/0048; H04L 5/0085; H04L 5/0057
See application file for complete search history.

(56) References Cited

U.S. PATENT DOCUMENTS

| 9,319,120 B2 | 1/2016 | Nagata et al. | |
| 2013/0242773 A1 | 9/2013 | Wernersson et al. | |
| 2013/0258964 A1* | 10/2013 | Nam | H04W 72/046 370/329 |
| 2013/0272151 A1 | 10/2013 | Thomas | |
| 2013/0301448 A1 | 11/2013 | Sayana | |
| 2014/0029463 A1 | 1/2014 | Su | |
| 2014/0036809 A1 | 2/2014 | Xu | |
| 2014/0073337 A1* | 3/2014 | Hong | H04W 16/28 455/452.1 |

(Continued)

*Primary Examiner* — Candal Elpenord
*Assistant Examiner* — Moo Jeong
(74) *Attorney, Agent, or Firm* — Gregory J. Albin; Charles A. Brill; Frank D. Cimino

(57) ABSTRACT

A user equipment device obtains a first measurement using a first CSI-RS sub-resource and a second measurement using a second CSI-RS sub-resource. The user device derives a single CSI-process based on the first and the second measurements and reports the CSI-process to a base station. The user device receives a message from the base station configuring the first and second CSI-RS sub-resources corresponding to the single CSI-process to be reported by the user device. The message from the base station comprises a configuration of the first CSI-RS sub-resource and a separate configuration of the second CSI-RS sub-resource. The configuration of each CSI-RS sub-resource comprises, for the corresponding CSI-RS sub-resource, at least a CSI-RS sub-resource index, a periodicity, and an offset. The user device may alternatively obtain measurements using any number of CSI-RS sub-resources and then derive and report a single CSI-process based on the plurality of measurements.

10 Claims, 7 Drawing Sheets

(56) References Cited

U.S. PATENT DOCUMENTS

| | | |
|---|---|---|
| 2014/0177745 A1 | 6/2014 | Krishnamurthy et al. |
| 2014/0204853 A1 | 7/2014 | Ko |
| 2014/0241323 A1 | 8/2014 | Park |
| 2015/0078472 A1* | 3/2015 | Vook .................... H04B 7/0617 375/267 |
| 2015/0124726 A1 | 5/2015 | Ni |
| 2015/0180628 A1* | 6/2015 | Kim ..................... H04B 7/0667 370/336 |
| 2015/0200755 A1 | 7/2015 | Hammarwall |
| 2016/0028519 A1 | 1/2016 | Wei |

\* cited by examiner

REFERENCE SIGNAL FOR 3D MIMO IN WIRELESS COMMUNICATION SYSTEMS

CROSS-REFERENCE TO RELATED APPLICATIONS

This application claims the benefit of the filing date of U.S. Provisional Patent Application No. 61/804,096, filed on Mar. 21, 2013, titled "Reference Signal for 3D MIMO in Wireless Communications Systems" the disclosure of which is hereby incorporated by reference herein in its entirety.

TECHNICAL FIELD

The technical field of this invention is wireless communication such as wireless telephony.

BACKGROUND

The present embodiments relate to wireless communication systems and, more particularly, to multi-input multi-output (MIMO) transmissions. With Orthogonal Frequency Division Multiplexing (OFDM), multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver. Among these are Channel State Information Reference Signals (CSI-RS) and Dedicated or Demodulation Reference Signals (DMRS). These reference signals are useful for channel estimation at the receiver.

The past three decades have witnessed the tremendous success and growth of cellular wireless communication. The number of cell phone users has exploded during that period. This was driven in part by demand for smart phone devices that provide high-speed data services, such as video streaming, online gaming, and such. Motivated by an increasing demand for network capacity and data speed, the latest fourth generation (4G) cellular communication systems featuring 3GPP Long-Term Evolution (LTE) and LTE-Advanced (LTE-A) achieve downlink spectral efficiency up to 30 bit/s/Hz, and maximum data rates of up to 30 Gbits/s over a 100 MHz system bandwidth.

Multiple-antenna systems are one of the most important techniques used in improving the data rate of a cellular communication system. By deploying multiple transmit antennas at a base station (e.g., an evolved NodeB or "eNB" in LTE systems), the base station is able to transmit multiple data streams simultaneously over the same spectrum bandwidth, thereby significantly increasing the efficiency of spectrum usage. Multiple data streams can only be decoded by a mobile terminal (e.g., user equipment or "UE" in LTE systems) that is equipped with multiple receive antennas. Assuming there are a total of Nt transmit antennas (i.e., multiple-input) at the eNB and Nr receive antennas at the UE (i.e., multiple-output), the number of data streams r transmitted in the downlink may vary from 1 to min(Nt, Nr), which is denoted by the channel rank hereinafter. Rank adaptation is performed at the eNB by intelligent eNB scheduling, facilitated by knowledge of channel state information (CSI) of the downlink propagation channel. CSI is measured by the UE and reported to the eNB in an uplink feedback mechanism.

SUMMARY

Designs for reference signals used for 3D MIMO systems are disclosed. RF technology advances allow 3D MIMO systems to control each element in an antenna array individually, which allows for control in both azimuth and elevation. To use an antenna system for 3D MIMO, the UE needs to measure the channel from the antenna array and provide feedback to the eNB. Although current LTE UEs can process reference signals from multiple eNBs using 2D MIMO, existing LTE reference signals do not support 3D MIMO.

Different antenna ports may be associated with different groups of antenna elements. An eNB can associate two different CSI-RS sub-resources to different antenna ports. For example, one CSI-RS sub-resource may target azimuth elements and another CSI-RS sub-resource may target elevation elements. Existing LTE systems use one CSI-RS resource per eNB to make one measurement and one report. Improved systems as disclosed herein use two or more CSI-RS resources or sub-resources to report two or more measurements in one CSI report.

In an example embodiment, a user device obtains a first measurement using a first CSI-RS sub-resource and a second measurement using a second CSI-RS sub-resource. The user device derives a single CSI-process based on the first and the second measurements and reports the CSI-process to a base station. The user device receives a message from the base station configuring the first and second CSI-RS sub-resources corresponding to the single CSI-process to be reported by the user device. The message from the base station comprises a configuration of the first CSI-RS sub-resource and a separate configuration of the second CSI-RS sub-resource. The configuration of each CSI-RS sub-resource comprises, for the corresponding CSI-RS sub-resource, at least a CSI-RS sub-resource index, a periodicity, and an offset. The user device may alternatively obtain measurements using any number of CSI-RS sub-resources and then derive and report a single CSI-process based on the plurality of measurements.

A periodicity of the first CSI-RS sub-resource may be larger than a periodicity of the second CSI-RS sub-resource. For example, the periodicity of the first CSI-RS sub-resource may be configured as N times of a periodicity of the second CSI-RS sub-resource, wherein N is an integer greater than or equal to 1. The first measurement and the second measurement are used to report on one CSI-process.

The first CSI-RS sub-resource may be associated with a first set of antenna ports and the second CSI-RS sub-resource may be associated with a second set of antenna ports at the base station. The first CSI-RS sub-resource may be used to report CSI for antenna ports in a horizontal axis and the second CSI-RS sub-resource may be used to report CSI for antenna ports in a vertical axis.

BRIEF DESCRIPTION OF THE DRAWINGS

These and other aspects of this invention are illustrated in the drawings, in which.

DETAILED DESCRIPTION

The invention(s) will now be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

CSI measurement and feedback in LTE Release 10 is enabled by a set of reference signals called CSI-RS. In particular, an eNB higher-layer configures a CSI-RS resource through Radio Resource Control (RRC) signaling for each UE. The CSI-RS resource configuration comprises parameters indicating:

the number of CSI-RS antenna ports,
the CSI-RS resource index,
the periodicity and offset of CSI-RS transmission, and
the relative transmit power of the CSI-RS.

With this information, the UE is able to measure the downlink wireless channel and report the CSI correspondingly. The number of CSI-RS antenna ports that can be configured for a UE is 1, or 2, or 4 or 8, thereby enabling 1Tx/2Tx/4Tx/8Tx MIMO. For UEs that are connected to and receive data from a single eNB, a single CSI-RS resource is configured.

Certain UEs may receive signals from multiple eNBs. It is possible to configure Coordinated Multiple-Point (CoMP) transmissions wherein multiple eNBs coordinate with each other in servicing the same UE. In particular, downlink transmissions from multiple adjacent eNBs are coordinated to avoid/cancel inter-cell interference, which effectively reduces the interference and boosts the signal-to-noise ratio of the user. One example of CoMP transmission is joint-processing wherein data for a UE might be transmitted from multiple adjacent eNBs. A UE receiving CoMP transmissions needs to be configured with multiple CSI-RS resources in order to measure channels to multiple eNBs. Each CSI-RS resource, which corresponds to a different eNB, is separately configured by the higher-layer RRC signaling, including the CSI-RS antenna port number, CSI-RS resource index, CSI-RS periodicity and offset, and CSI-RS power.

Figure 1:
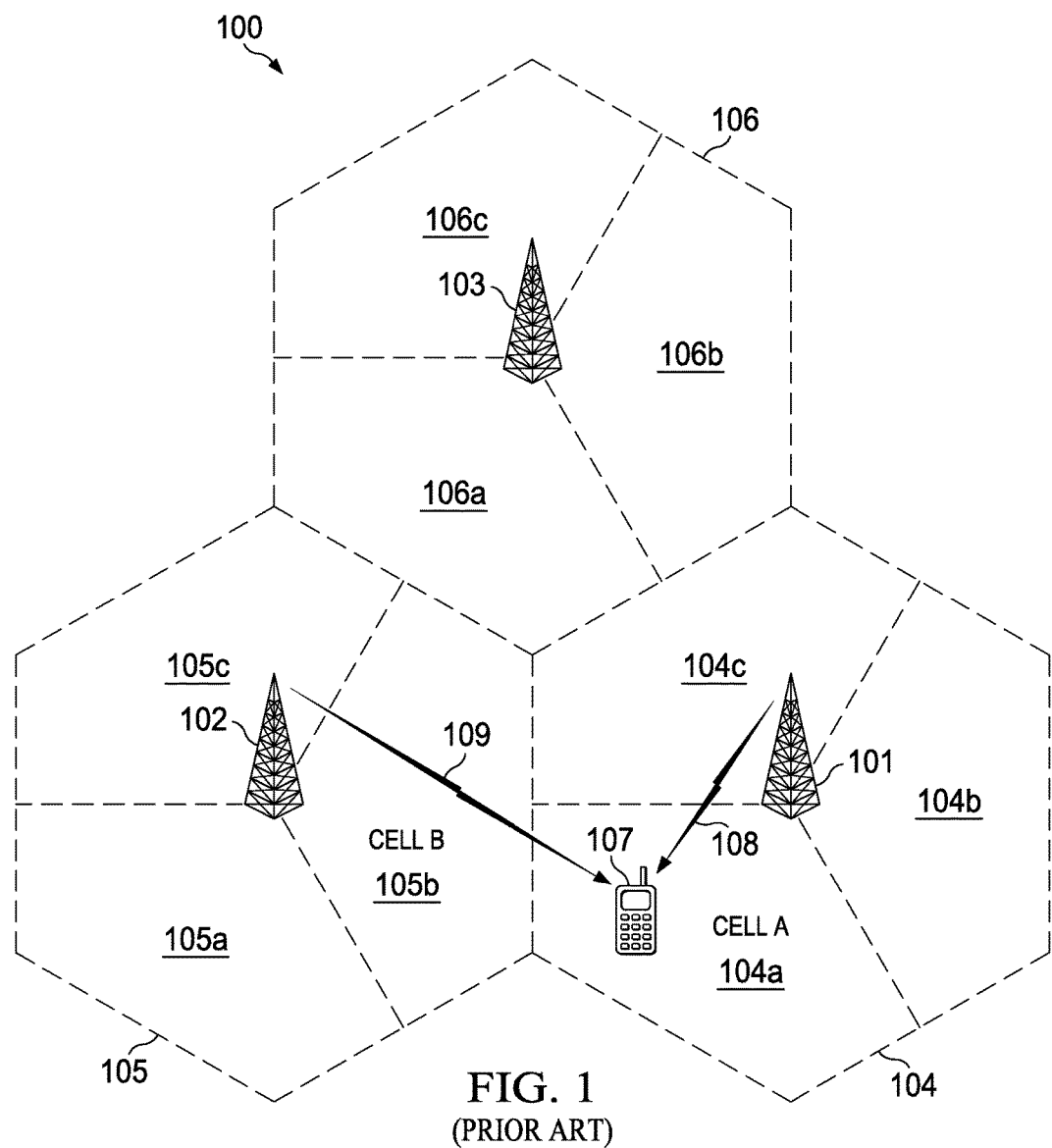
FIG. 1 illustrates an exemplary wireless telecommunications network 100.

FIG. 1 illustrates an exemplary wireless telecommunications network 100. Network 100 includes a plurality of base stations 101, 102 and 103, such as eNBs in an LTE system. In operation, a telecommunications network necessarily includes many more base stations. Each base station 101, 102 and 103 is operable over corresponding coverage areas 104, 105 and 106. Each base station's coverage area is further divided into cells. In the illustrated network, each base station's coverage area is divided into three cells 104a-c, 105a-c, 106a-c. User equipment (UE) 107, such as a mobile telephone handset, receives transmissions 108 from base station 101. UE 107 is configured with CSI-RS resources to measure the channel 108 from eNB 101.

UE 107 may also receive transmissions 109 from base station 102. UE 107 is further configured by the higher-layer RRC signaling with a separate CSI-RS resource in order to measure the channel 109 from eNB 102.

The base stations 101, 102 configure UE 107 for periodic uplink Sounding Reference Signal (SRS) transmission. Base station 101 estimates uplink channel state information (CSI) for each base station from the SRS transmissions. For downlink data transmission in a cellular communication system, UE 107 measures the downlink wireless channel via downlink reference signals and reports the measured Channel State Information (CSI) to the eNB. The eNBs utilize the CSI reports to perform downlink link adaptation and scheduling to determine data transmission schemes to the UE, including but not limited to time/frequency resource assignment, modulation and coding schemes.

The reference signals used by UE 107 for channel estimation can be Cell-specific Reference Signals (CRS) or Channel State Information Reference Signals (CSI-RS) in LTE. CSI is reported in the form of a set of recommended MIMO transmission properties to the eNB. CSI consists of Channel Quality Indicator (CQI), precoding matrix indicator (PMI), precoding type indicator (PTI), and/or rank indication (RI). RI indicates the number of data layers that the UE recommends the eNB to transmit. PMI is the index to a recommended precoding matrix in a pre-determined codebook known to the eNB and the UE in advance. CQI reflects the channel quality that the UE expects to experience if the recommended RI/PMI is used for data transmission. The time and frequency resources that can be used by the UE to report CSI are controlled by the eNB. A UE is semi-statically configured by higher layers to periodically feedback different CSI components (CQI, PMI, PTI, and/or RI) on the Physical Uplink Control CHannel (PUCCH). Different PUCCH modes can be configured for CSI feedback.

Figure 2:
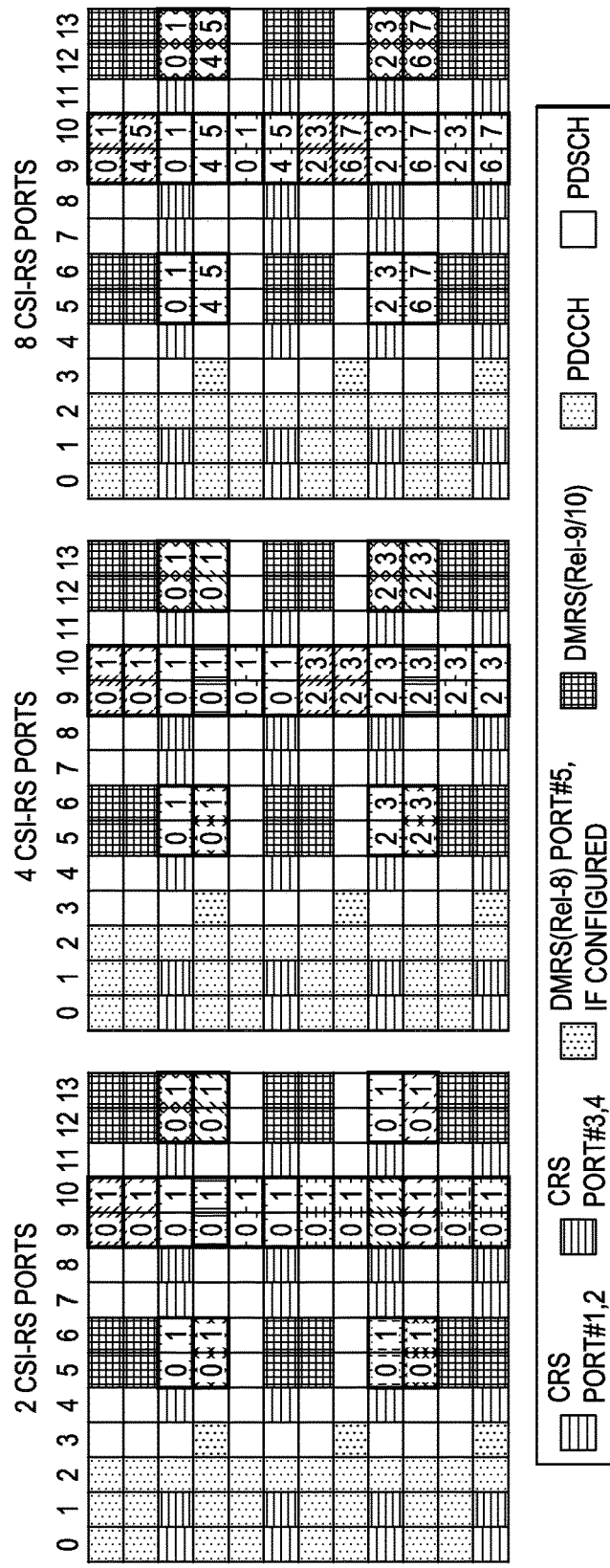
FIG. 2 illustrates the CSI-RS resources that can be configured for a UE to measure the channel between the UE and an eNB using 2Tx, 4Tx, and 8Tx MIMO with a normal cyclic prefix (CP).

FIG. 2 illustrates the CSI-RS resources that can be configured for a UE using 2Tx, 4Tx, and 8Tx MIMO for an OFDM system with a normal cyclic prefix (CP). These CSI-RS resources allow the UE to perform channel estimation. The number of CSI-RS resources varies by antenna. For each channel that the UE needs to measure, one of the available CSI-RS configurations is configured to the UE by higher-layer signaling.

Figure 3:
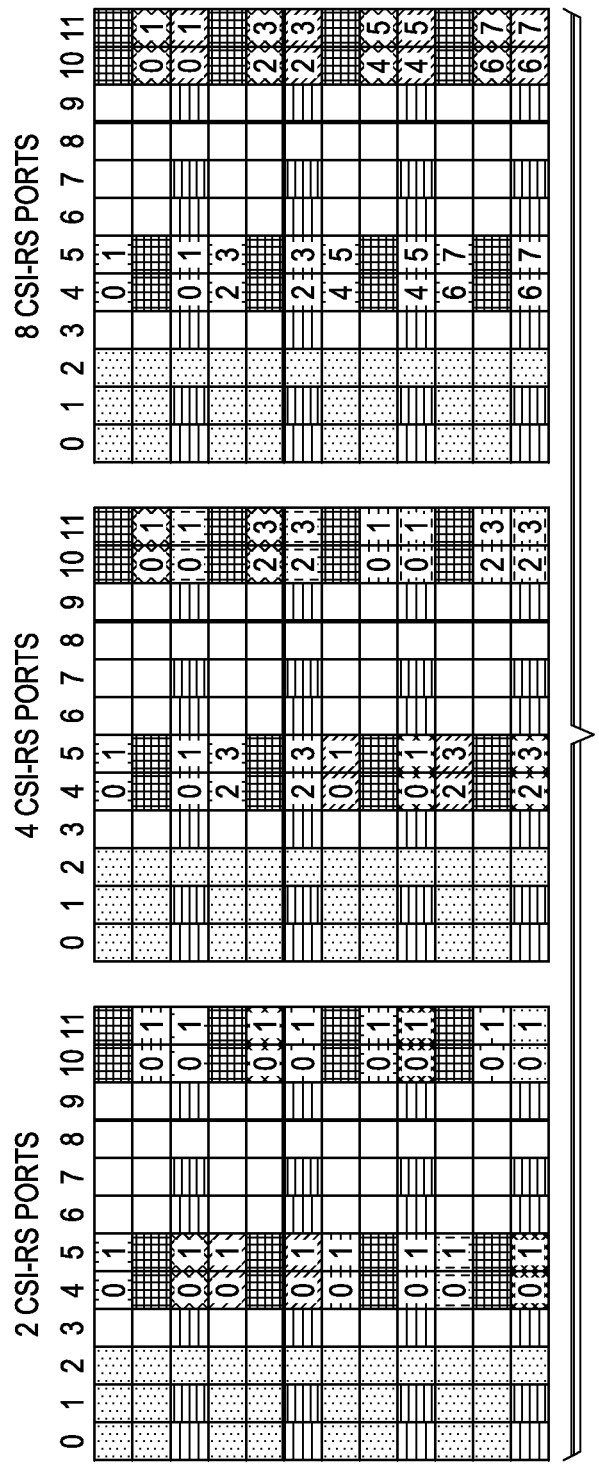
FIG. 3 illustrates the CSI-RS resources that can be configured for a UE to measure the channel between the UE and an eNB using 2Tx, 4Tx, and 8Tx MIMO with an extended cyclic prefix (CP).

FIG. 3 illustrates the CSI-RS resources that can be configured for a UE using 2Tx, 4Tx, and 8Tx MIMO for an OFDM system with an extended cyclic prefix (CP).

The difference between a physical antenna and an antenna port should be clearly noted for a multi-vendor system such as LTE. Different eNB vendors in the cellular base station market may deploy different numbers of physical antennas at their eNB products. Furthermore, the number of physical antennas for different types of base stations may be different. For example, a macro base station designed for covering a wide metropolitan area may deploy a large antenna array, while a small form-factor base station (e.g., a pico- or femto-cell base station) that is designed for covering a small area may be equipped with a small number of physical antennas due to form-factor restrictions.

It is would be extremely complicated if the LTE standard was required to support all possible physical antenna configurations. To limit standardization efforts while allowing sufficient implementation flexibility to eNB vendors, LTE has adopted the "antenna port" concept. An antenna port is a "reference signal" on which the wireless propagation channel property experienced by one signal can be inferred by another signal. As such, an antenna port is uniquely determined by a reference signal based on which the UE can measure the associated channel. Hence, if two physical antennas are used to transmit the same signal, they appear to a UE as one antenna port. In this case, the UE is not able to differentiate between these two physical antennas. The mapping between physical antennas and antenna ports is an eNB implementation choice and may be transparent from the UE's perspective. Therefore, from the UE's perspective, it can differentiate between antenna ports because they are associated with different reference signals, but it cannot differentiate between physical antennas.

Figure 4:
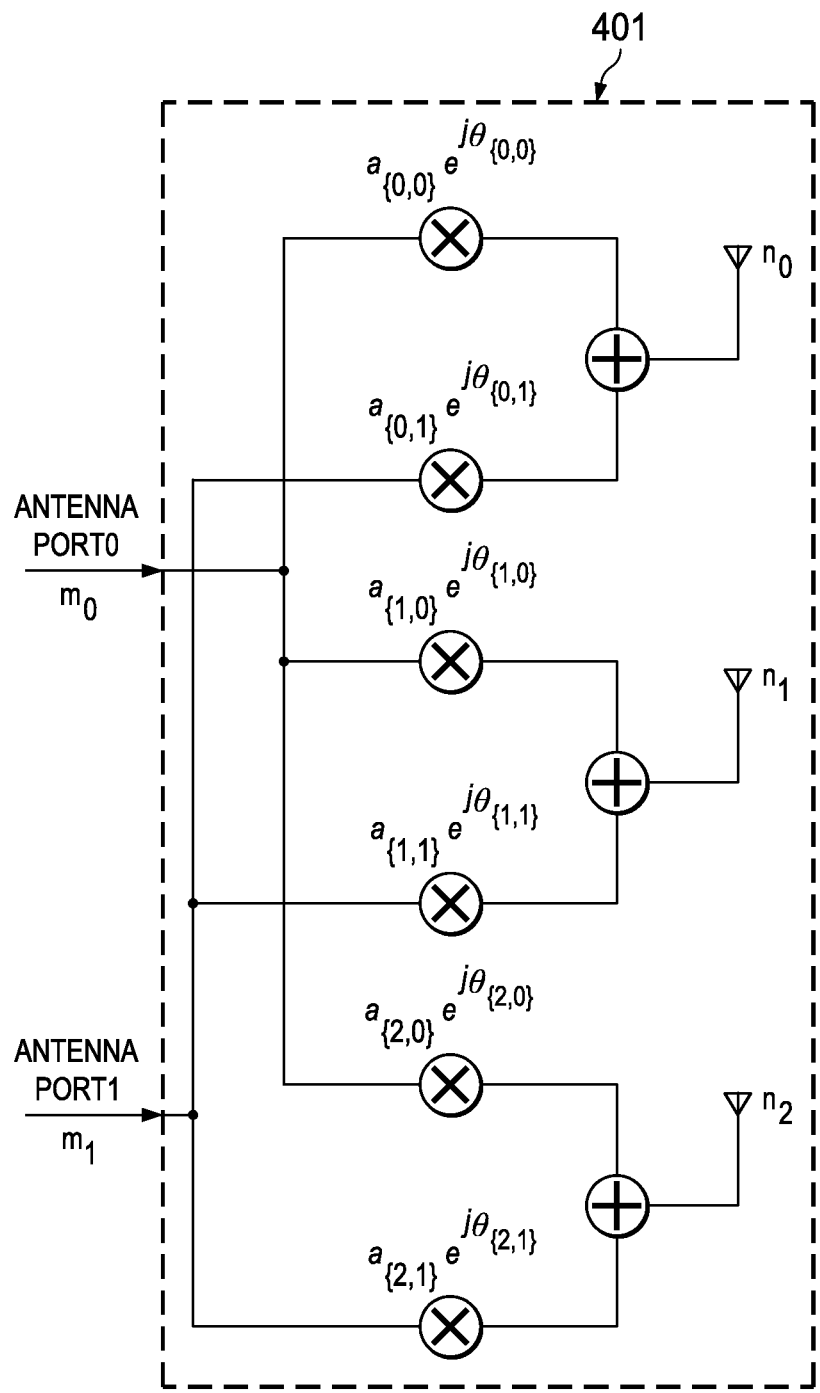
FIG. 4 illustrates an example of amplitude and phase scaling of a signal from an antenna port to a physical antenna.

FIG. 4 illustrates an example of amplitude and phase scaling of a signal from antenna port m to a physical antenna n. The antenna port m to physical antenna n mapping, inside block 401, is transparent to the UE.

As a consequence of using the antenna port concept, an LTE system standardizes only a finite set of antenna ports while allowing different eNB vendors to use an arbitrary number of physical antennas. For instance, LTE standardizes 1-port, 2-port, 4-port, and 8-port transmissions, but a vendor is free to deploy an arbitrary number of physical antennas in a practical eNB implementation. As an example, an eNB vendor whose eNB has sixteen physical antennas may configure its eNB as a two-antenna-port system by appropriately mapping the sixteen physical antennas to the two antenna ports. From the UE's perspective, it appears as if the eNB has only two physical antennas.

High-order MIMO and Three-dimensional (3D) MIMO

Recent technical breakthroughs in RF and IC design have opened new horizons for more advanced antenna deployments at the base station. Three-dimensional and high-order MIMO are two techniques of interest in this segment.

In a typical base station deployment for 3GPP LTE, the base station employs an array of cross-polarized or co-polarized antennas that are spaced in the azimuth (horizontal) domain. Each antenna (which may correspond to one panel on an antenna structure) is actually formed by co-phasing an integer number of vertically arranged physical sub-elements within the panel to achieve a desired elevation (vertical) pattern and overall gain in the elevation domain.

Figure 5:
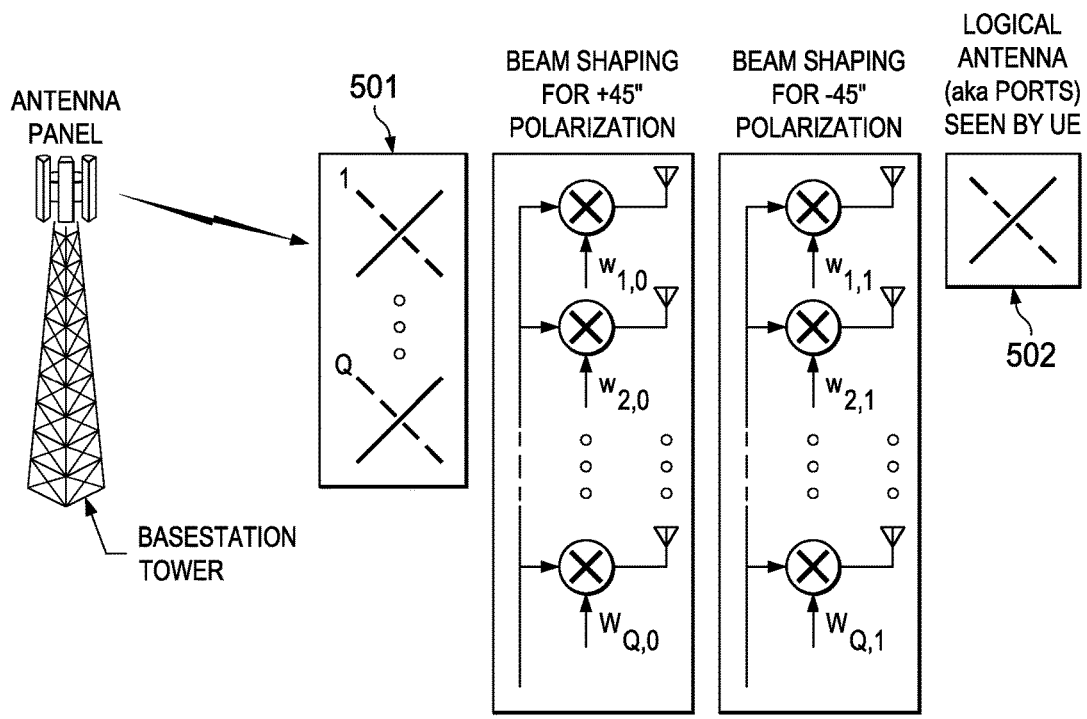
FIG. 5 is an example of a two-antenna base station in azimuth with multiple antenna sub-elements for each azimuth antenna.

FIG. 5 is an example of a two-antenna base station in azimuth direction with Q antenna sub-elements for each azimuth antenna. In one embodiment, for example, Q=5. Array 501 represents a single column of sub-elements that use one set of CSI-RS resources. Transmissions from array 501 appear logically as one antenna 502 to the UE.

In another embodiment, the sub-elements in array 501 may be used as separate antennas. If these vertically arranged sub-elements are individually and adaptively controlled, then the antenna array 501 could adapt its transmission in both the elevation and azimuth dimensions, allowing for much more flexible antenna pattern shaping, adaptive beamforming, and adaptive cell shaping.

Figure 6:
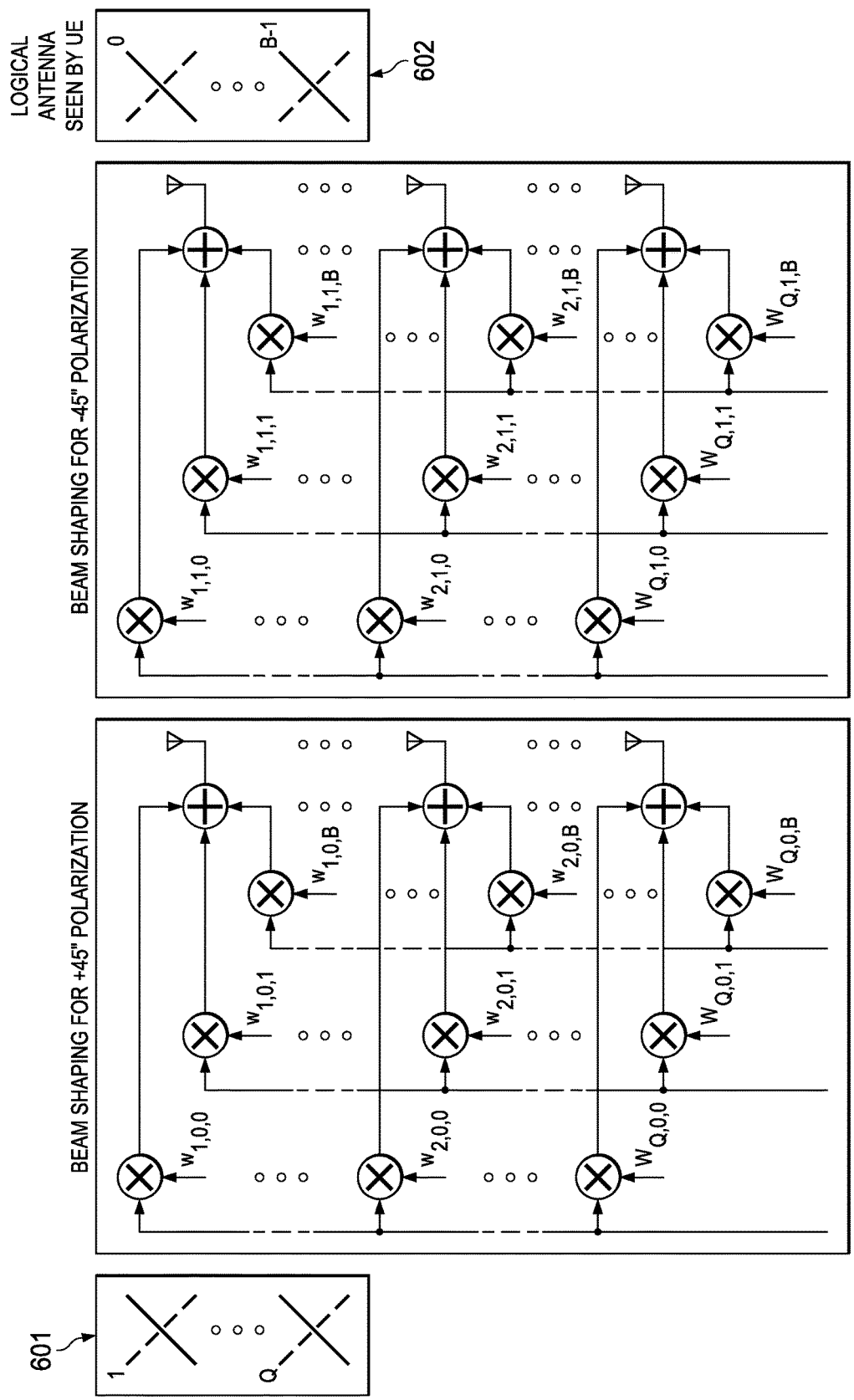
FIG. 6 is an example of controlling a single column array in both elevation and azimuth.

FIG. 6 is an example of controlling a single column array 601 in both elevation and azimuth. Two sets of CSI-RS resources are used with array 601. The signal $w_{\{n,m,b\}}$ denotes the phase and amplitude scaling of the $n^{th}$ physical antenna corresponding to the $m^{th}$ antenna port in the azimuth direction and the $b^{th}$ antenna port in the elevation direction, where m=0,1 (i.e., two horizontal antenna ports) and b=0, . . . ,B (i.e., B+1 vertical antenna ports). Traditionally, 2Tx MIMO in azimuth direction requires two RF chains that separately control two azimuth antennas. In an example system using 5 sub-elements (Q=5), by deployment of 2Q RF chains to independently control the Q'=2Q=10 sub-elements, beamforming can be extended from the 2D azimuth-only domain to 3D in both azimuth and elevation domains, thereby allowing greater beamforming flexibility at the base station. It is possible for 3D MIMO to create a total of 2(B+1) antenna ports from a total of Q' sub-elements, where 2(B+1)<=Q'. Transmissions appear to a UE as coming from two logical antennas 602.

With the possibility of individually controlling each of the array panel sub-elements, the antenna array size that needs to be supported by the specification may need to be increased (e.g., from 2 to 2(B+1) in FIG. 5). This is needed as the eNB needs the CSI information of the size-2(B+1) virtual MIMO array in order to efficiently perform precoding. Clearly, an increased number of antenna ports (e.g., 16, 32, 64) needs to be supported in LTE beyond the current maximum antenna port configuration (8Tx). In the remaining sections of this disclosure, CSI-RS for higher-order MIMO and 3D beamforming is discussed along with a proposal for a new CSI-RS pattern and configuration mechanism for LTE Release 12 and beyond.

In this section, the focus of the discussion is directed to a UE measuring the downlink channel for a single eNB (e.g., non-CoMP communication). The proposed solution can be easily extended to a CoMP deployment where a UE measures the channels to multiple eNBs by applying the proposed CSI-RS configuration method to each eNB separately.

A UE configured with one CSI process (i.e., configured to measure the downlink channel of a single eNB), is configured with one CSI-RS resource, which is associated to two CSI-RS sub-resources—denoted herein as sub-resource 1 and sub-resource 2.

As an exemplary use case, CSI-RS sub-resource 1 is used by the UE to report CSI for array sub-elements within one antenna panel in the elevation domain, and sub-resource 2 is used by the UE to report CSI between different antenna panels in the azimuth domain.

Figure 7:
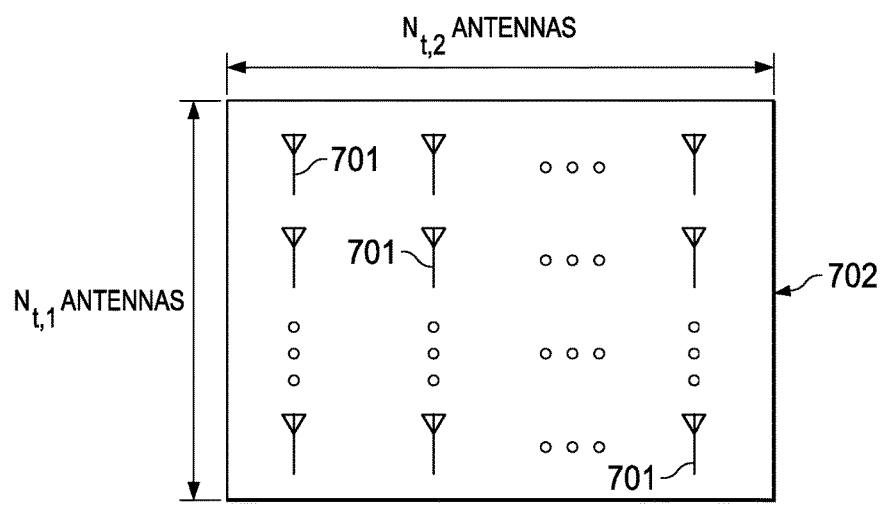
FIG. 7 illustrates an exemplary use case wherein each physical antenna can be configured to be associated with one antenna port.

FIG. 7 illustrates an exemplary use case. Each physical antenna 701 can be configured to be associated with one antenna port. A first CSI-RS sub-resource is used to report CSI for antenna ports in the horizontal axis (i.e., the $N_{t,2}$ antennas), and a second CSI-RS sub-resource is used to report CSI for antenna ports in the vertical axis (i.e., the $N_{t,1}$ antennas). Corresponding to each CSI-RS sub-resource, the UE may report the corresponding channel state information, or a specific property of the channel state information, in the horizontal or vertical axis. Upon receiving the reported channel state information for the vertical or horizontal axis, the eNB is able to interpret the composite channel state information of the 3D-MIMO array and determine the optimal MIMO transmission strategy in the downlink. As a more detailed example, assume the eNB has a 32Tx 3D MIMO array, with $N_{t,1}$=4 antennas in the vertical domain and $N_{t,2}$=8 antennas in the horizontal domain. The UE uses CSI-RS sub-resource 1 to report a 4Tx precoding vector (V$_1$) for beamforming in the vertical domain, and uses CSI-RS sub-resource 2 to report an 8Tx precoding vector (V$_2$) for beamforming in the horizontal domain. Upon receiving the two precoding vectors, the eNB may perform a Kronecker product of the two precoding vectors to derive the optimal 32Tx precoding vector (V) for the 3D MIMO array, expressed as $$V=V_1 \otimes V_2 \quad \text{(Eq. 1)}$$

Each CSI sub-resource (e.g., sub-resource 1 and sub-resource 2) are independently configured by higher-layer RRC signaling with one or more of the following parameters:

Number of CSI-RS antenna ports;
CSI-RS resource index;
CSI-RS subframe periodicity and offset;
Ratio of energy-per-resource-element (EPRE) of CSI-RS relative to the hypothetical PDSCH transmission power p. In one embodiment, it is also possible that an EPRE ratio p is configured for the CSI-RS resource, but not configured for each CSI-RS sub-resource. In another embodiment, the EPRE ratio p is configured for CSI-RS sub-resource 1, but not CSI-RS sub-resource 2, or vice versa.
In addition a CRS port for quasi-collocation assumption may be indicated.

The number of CSI-RS antenna ports for each of the CSI-RS sub-resources k (k=1, 2) shall only take values of possible CSI-RS antenna port numbers in LTE Release 11, e.g., {1, 2, 4, 8} ports.

The total number of CSI-RS antenna ports of the CSI-RS resource, defined by Nt, is a function of the number of CSI-RS antenna ports of both sub-resource 1 (defined as $N_{t,1}$) and sub-resource 2 (defined as $N_{t,2}$). In one embodiment, $N_t = N_{t,1} \times N_{t,2}$, corresponding to the squared antenna array 702 depicted in FIG. 7.

The CSI-RS resource index for each of the CSI-RS sub-resources k (k=1, 2) shall only take values of possible CSI-RS resource indices in LTE Release 11, which is dependent on the number of CSI-RS antenna ports ($N_{t,k}$) configured for the corresponding CSI-RS sub-resource k (k=1, 2).

The CSI-RS subframe periodicity and offset can be separately configured for CSI-RS sub-resource k (k=1, 2). Furthermore, it is possible for the subframe periodicity of CSI-RS sub-resource 1 to be an integer multiple M (e.g., M=1, 2, . . . ) of the subframe periodicity of CSI-RS sub-resource 2, or vice versa.

Figure 8:
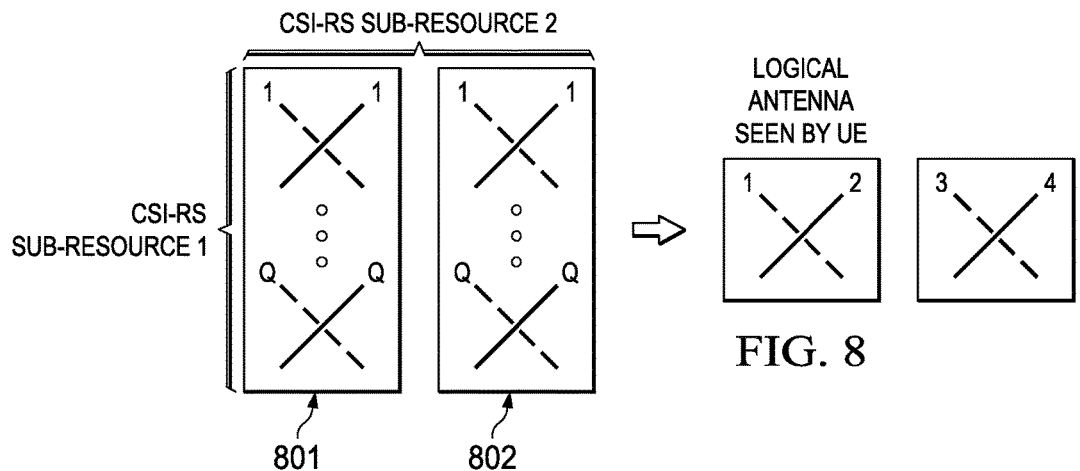
FIG. 8 illustrates an exemplary use case in which a first sub-resource is used to measure the CSI of sub-elements within one antenna panel, and a second sub-resource is used to measure CSI between multiple antenna panels.

FIG. 8 illustrates an exemplary use case of this configuration in which sub-resource 1 is used to measure the CSI of sub-elements in the vertical domain within antenna panel 801, and sub-resource 2 is used to measure CSI in the horizontal domain between antenna panels 801 and 802. As the spatial correlation between sub-elements within the same panel is usually high and changes slowly in the time domain, a low CSI-RS subframe periodicity may be sufficient for CSI-RS sub-resource 1 (which is associated with one panel 801) but may not be sufficient for sub-resource 2 (which is associated with two panels 801, 802).

It is possible for a CSI-RS sub-resource to be named differently, e.g. component resource, etc. However the reference signal configuration mechanism proposed above shall still apply.

It is possible for the eNB higher layer to configure N>2 CSI-RS sub-resources. The number (N) of CSI-RS sub-resources that can be provided to a UE can be either fixed in the specification, or semi-statically configured by higher-layer RRC signaling.

Figure 9:
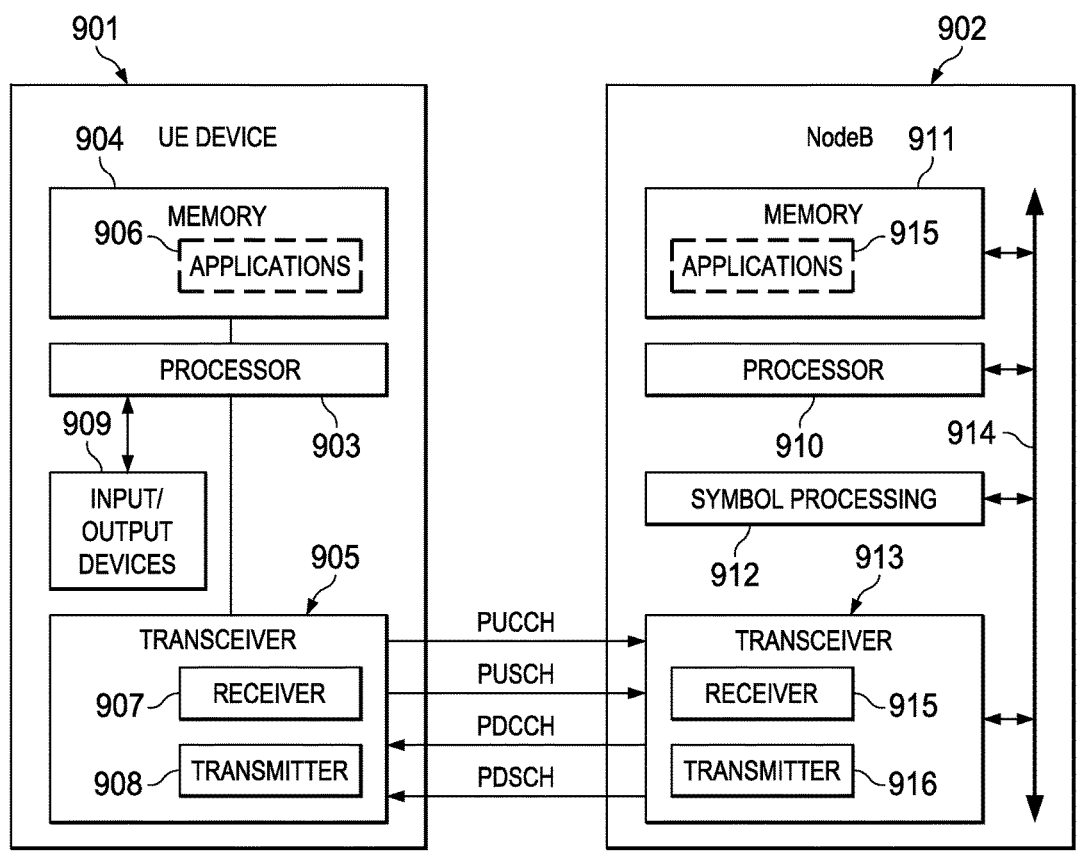
FIG. 9 is a block diagram illustrating internal details of a mobile UE and an eNB in a network system.

FIG. 9 is a block diagram illustrating internal details of a mobile UE 901 and an eNB 902 in the network system of FIG. 1. Mobile UE 901 may represent any of a variety of devices such as a server, a desktop computer, a laptop computer, a cellular phone, a Personal Digital Assistant (PDA), a smart phone or other electronic devices. In some embodiments, the electronic mobile UE 901 communicates with eNB 902 based on a LTE or Evolved Universal Terrestrial Radio Access (E-UTRA) protocol. Alternatively, another communication protocol now known or later developed can be used.

Mobile UE 901 comprises a processor 903 coupled to a memory 904 and a transceiver 905. The memory 904 stores (software) applications 906 for execution by the processor 903. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 901 to transmit UL signals to eNB (base station) 902 periodically or continuously via the transceiver 905. In at least some embodiments, the mobile UE 901 identifies a Quality of Service (QoS) requirement when requesting an uplink resource from eNB 902. In some cases, the QoS requirement may be implicitly derived by eNB 902 from the type of traffic supported by the mobile UE 901. As an example, VOIP and gaming applications often involve low-latency uplink (UL) transmissions while High Throughput (HTP)/Hypertext Transmission Protocol (HTTP) traffic can involve high-latency uplink transmissions.

Transceiver 905 includes uplink logic which may be implemented by execution of instructions that control the operation of the transceiver. Some of these instructions may be stored in memory 904 and executed when needed by processor 903. As would be understood by one of skill in the art, the components of the uplink logic may involve the physical (PHY) layer and/or the Media Access Control (MAC) layer of the transceiver 905. Transceiver 905 includes one or more receivers 907 and one or more transmitters 908.

Processor 903 may send or receive data to various input/output devices 909. A subscriber identity module (SIM) card stores and retrieves information used for making calls via the cellular system. A Bluetooth baseband unit may be provided for wireless connection to a microphone and headset for sending and receiving voice data. Processor 903 may send information to a display unit for interaction with a user of mobile UE 901 during a call process. The display may also display pictures received from the network, from a local camera, or from other sources such as a Universal Serial Bus (USB) connector. Processor 903 may also send a video stream to the display that is received from various sources such as the cellular network via RF transceiver 905 or the camera.

During transmission and reception of voice data or other application data, transmitter 907 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 904 by processor 903. In other embodiments, the message size determination may be embodied by a separate processor/memory unit, by a hardwired state machine, or by other types of control logic, for example.

eNB 902 comprises a processor 910 coupled to a memory 911, symbol processing circuitry 912, and a transceiver 913 via backplane bus 914. The memory stores applications 915 for execution by processor 910. The applications could comprise any known or future application useful for managing wireless communications. At least some of the applications 915 may direct eNB 902 to manage transmissions to or from mobile UE 901.

Transceiver 913 comprises an uplink resource manager, which enables eNB 902 to selectively allocate uplink Physical Uplink Shared CHannel (PUSCH) resources to mobile UE 901. As would be understood by one of skill in the art, the components of the uplink resource manager may involve the physical (PHY) layer and/or the Media Access Control (MAC) layer of the transceiver 913. Transceiver 913 includes at least one receiver 915 for receiving transmissions from various UEs within range of eNB 902 and at least one transmitter 916 for transmitting data and control information to the various UEs within range of eNB 902.

The uplink resource manager executes instructions that control the operation of transceiver 913. Some of these instructions may be located in memory 911 and executed when needed on processor 910. The resource manager controls the transmission resources allocated to each UE 901 served by eNB 902 and broadcasts control information via the PDCCH.

Symbol processing circuitry 912 performs demodulation using known techniques. Random access signals are demodulated in symbol processing circuitry 912.

During transmission and reception of voice data or other application data, receiver 915 may receive a random access signal from a UE 901. The random access signal is encoded to request a message size that is preferred by UE 901. UE 901 determines the preferred message size by using a message threshold provided by eNB 902.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method for providing channel state information (CSI) feedback between a base station and a user device, comprising:
obtaining, at the user device, a first measurement using a first channel state information reference signal (CSI-RS) sub-resource;
obtaining, at the user device, a second measurement using a second CSI-RS sub-resource;
deriving a single CSI-process based on the first and the second measurements;
reporting said CSI-process to the base station; and
receiving a message from the base station configuring the first and second CSI-RS sub-resources corresponding to said single CSI-process to be reported by the user device.

2. The method of claim 1, wherein the message from the base station comprises a configuration of the first CSI-RS sub-resource and a separate configuration of the second CSI-RS sub-resource; and the configuration of each CSI-RS sub-resource comprises, for the corresponding CSI-RS sub-resource, at least a CSI-RS sub-resource index, a periodicity, and an offset.

3. The method of claim 2, wherein a periodicity of the first CSI-RS sub-resource is larger than a periodicity of the second CSI-RS sub-resource.

4. The method of claim 2, wherein a periodicity of the first CSI-RS sub-resource is configured as N times of a periodicity of the second CSI-RS sub-resource, wherein N is an integer greater than or equal to 1.

5. A user equipment device, comprising:
a processor circuit configured to:
obtain a first measurement using a first channel state information reference signal (CSI-RS) sub-resource;
obtain a second measurement using a second CSI-RS sub-resource;
derive a single CSI-process based on the first and the second measurements;
report said CSI-process to a base station; and
receive a message from the base station configuring the first and second CSI-RS sub-resources corresponding to said single CSI-process to be reported by the user device.

6. The user equipment device of claim 5, wherein the message from the base station comprises a configuration of the first CSI-RS sub-resource and a separate configuration of the second CSI-RS sub-resource; and the configuration of each CSI-RS sub-resource comprises, for the corresponding CSI-RS sub-resource, at least a CSI-RS sub-resource index, a periodicity, and an offset.

7. The user equipment device of claim 6, wherein a periodicity of the first CSI-RS sub-resource is larger than a periodicity of the second CSI-RS sub-resource.

8. The user equipment device of claim 6, wherein a periodicity of the first CSI-RS sub-resource is configured as N times of a periodicity of the second CSI-RS sub-resource, wherein N is an integer greater than or equal to 1.

9. A method for providing channel state information (CSI) feedback between a base station and a user device, comprising:
obtaining, at the user device, a plurality of measurements for each of a plurality of channel state information reference signal (CSI-RS) sub-resources;
deriving a single CSI-process based on the plurality of measurements;
reporting said CSI-process to the base station; and
receiving a message from the base station configuring the plurality of CSI-RS sub-resources corresponding to said single CSI-process to be reported by the user device.

10. The method of claim 9, wherein the message from the base station comprises a configuration of the plurality of CSI-RS sub-resources; and wherein the configuration of each CSI-RS sub-resource comprises at least a CSI-RS sub-resource index, a periodicity, and an offset.

* * * * *